Patented Dec. 5, 1922.

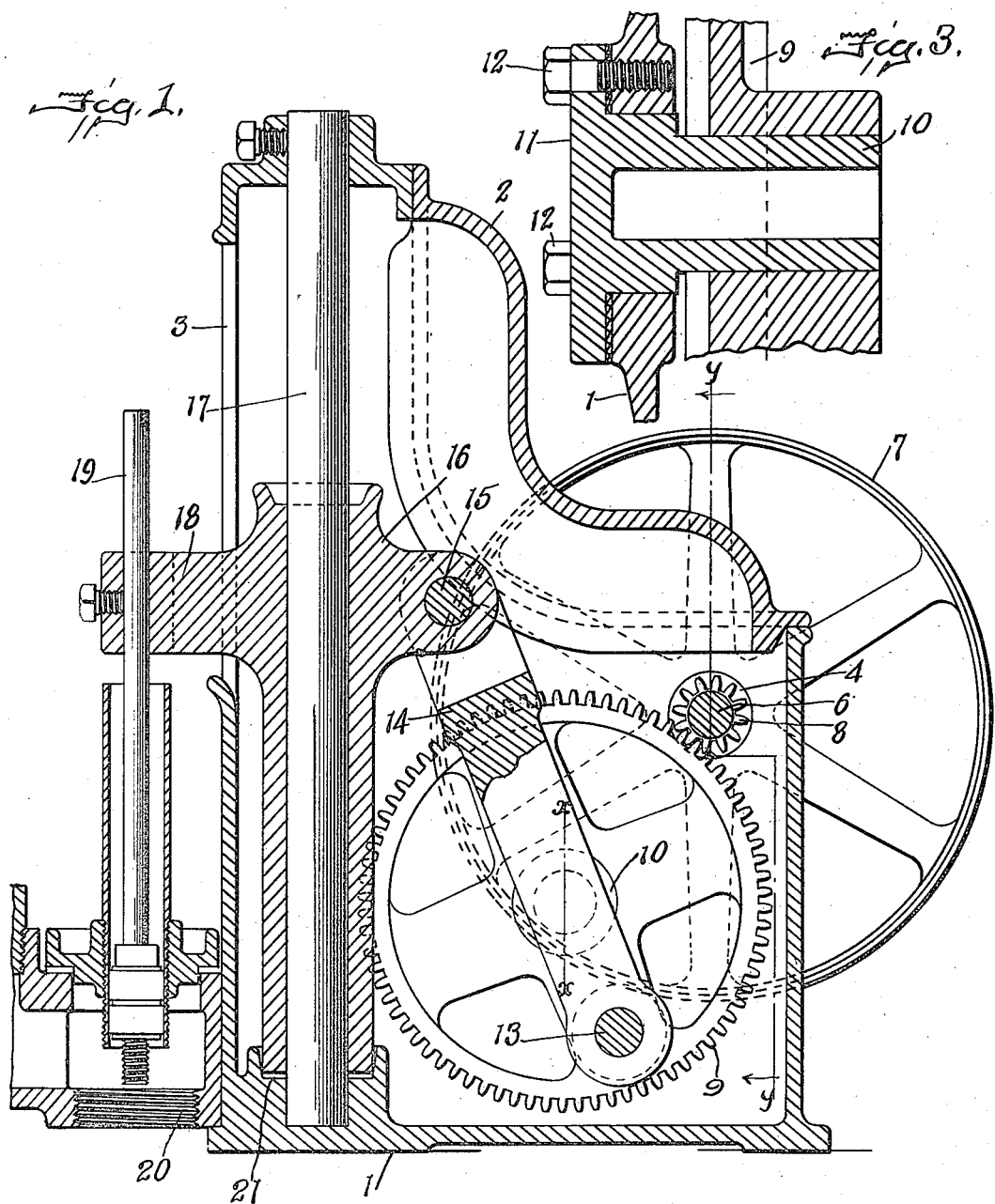

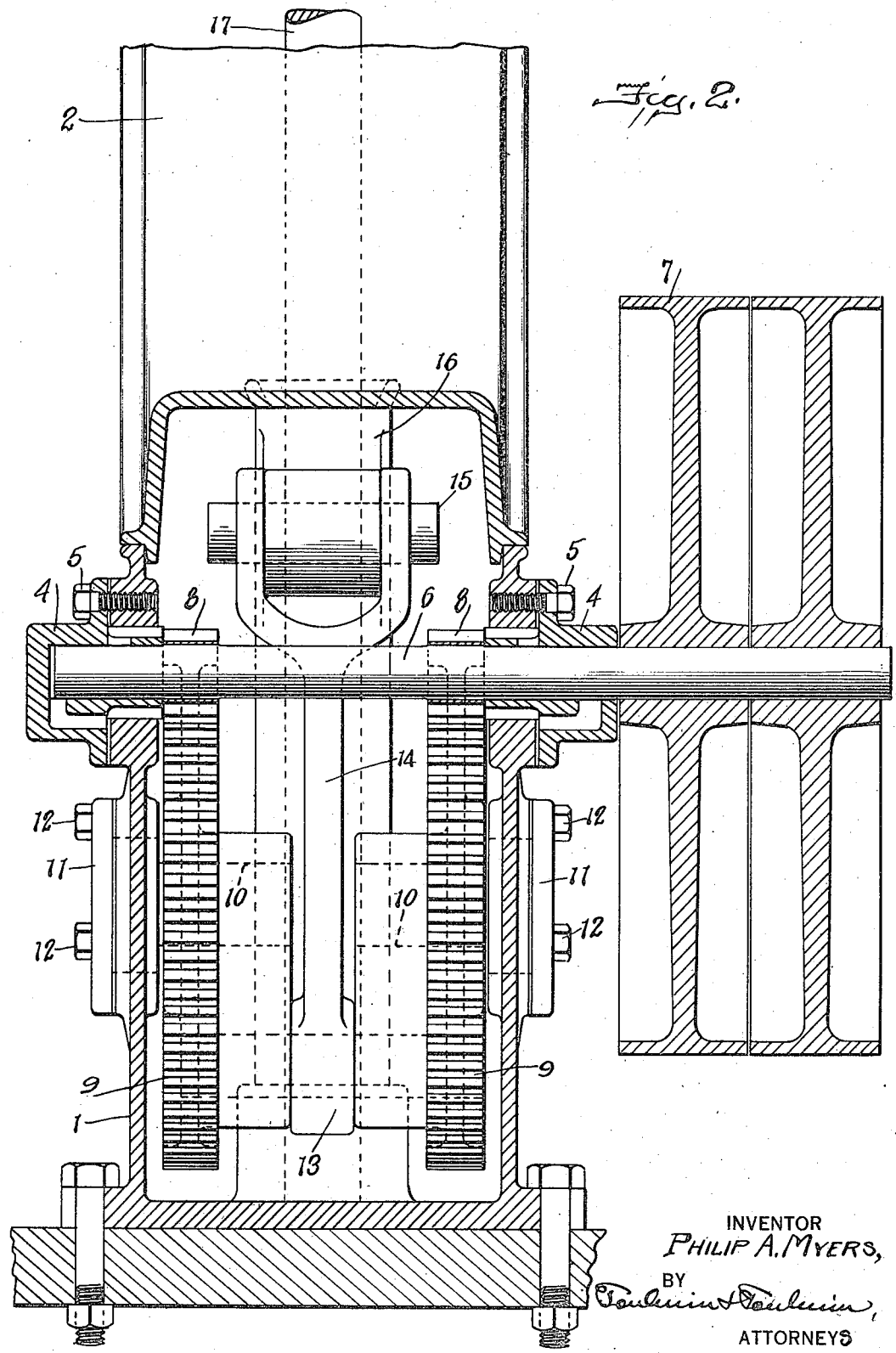

1,437,988

UNITED STATES PATENT OFFICE.

PHILIP A. MYERS, OF ASHLAND, OHIO, ASSIGNOR TO F. E. MYERS & BROTHER, A CO-PARTNERSHIP CONSISTING OF FRANCIS E. MYERS AND PHILIP A. MYERS, BOTH OF ASHLAND, OHIO.

POWER HEAD.

Application filed August 30, 1920. Serial No. 407,024.

*To all whom it may concern:*

Be it known that I, PHILIP A. MYERS, a citizen of the United States, residing at Ashland, in the county of Ashland and State of Ohio, have invented certain new and useful Improvements in Power Heads, of which the following is a specification, reference being had therein to the accompanying drawing.

This invention relates to an improved power head for use in operating pumps, usually domestic pumps which stand in a vertical position.

This power head consists, essentially, as to the improvements to be now set forth, of a casing adapted to contain a lubricant, with a removable cover for the insertion and withdrawal of the interior mechanism and another opening through which one of the interior operating parts may extend to be connected with a pump or other machine the power head will operate; of driving pinions and driven gears removably mounted in the casing, the gears being spaced apart and having a wrist pin so that a pitman may be placed between the gears and on the pin and a sliding member operated by the pitman and itself adapted to actuate outside mechanism, as a pump.

In the accompanying drawings—

Fig. 1 is a vertical, sectional view of my improved power head,

Fig. 2 is a transverse, sectional view on the line *y—y* of Fig. 1; and

Fig. 3 is a sectional view of a part of the casing, the removable plate and the stud shaft, the section being taken on the line *x—x* of Fig. 1.

In the drawings, the numeral 1 designates the casing of the power head comprising a box-like structure, usually made of cast iron, with an opening in which is seated a removable cover 2. This opening is of dimensions adapting it to permit of the insertion and removal of the interior mechanism, as when assembling the parts or putting in repairs. The casing is also slotted, as shown at 3, to permit of the passage therethrough of one of the operating members, as will later more fully appear.

As more particularly shown in Fig. 2, the casing is equipped at each side with a removable bearing 4 held by bolts 5. In such bearings is mounted a driving shaft 6 carrying outside of the casing fast and loose belt pulleys 7 and within it two pinions 8. These pinions each mesh with a gear wheel 9, there being two such gears. Each gear wheel is mounted on a stud shaft 10 carried by or formed on removable plates 11, also held by screws 12. By means of these removable plates the stud shafts can be easily withdrawn should occasion require, while they are also easily assembled. And in the case of the bearing 4 its diameter is such that when it is removed the hole in the casing is large enough to permit the pinions to be removed from the casing by withdrawing the shaft 6. In the case of the plates 11, as particularly seen in Fig. 3, they and their stud shaft 10 can also be removed, as when the gear wheels 9 are to be taken out of the casing. These constructions are of practical utility in the assembling operations at the factory, as well as in the course of use.

These devices and their arrangement constitute the subject matter of a divisional application, divided out of this case, Ser. No. 598,899, filed Nov. 3, 1922. But I retain in the present specification the foregoing description in order to make complete the entire power head, as shown in the drawings.

Extending from one to the other of the gear wheels 9 is a wrist pin 13 whose function is to operate a pitman 14, mounted on this pin at one end and occupying a position between the two gear wheels. As the gear wheels are supported on stud shafts, which terminate near the inner faces of the wheels, there is no obstruction to the movements of the pitman. Its upper end is attached by a bearing bolt 15 to a reciprocating sleeve or member 16 mounted on a guide rod 17 secured at its upper and lower ends to and within the casing. The sleeve has an arm 18 which projects through the slot 3 of the casing and extends out a suitable distance for attachment to any mechanism which the sleeve is to operate, as the piston rod 19 of a pump.

It will be noted too that the pitman swings at its lower end so close to the sleeve that during a part of the time it is nearly in the vertical. This occurs on the upstroke of the pitman, so that it is in this substantially vertical position when lifting the load through the greater part of the stroke—an advantage in that it prevents the side thrust of the sleeve against the guiding shaft 17 and thus reduces friction and conserves power.

The two features of the connection of the pump head or cap 20 with the casing of an oil sump 21 are embodied in my copending application, Ser. No. 351,966, filed Jany. 16th, 1920, and from which application the present subject matter has been divided out as constituting a separate invention.

Having thus fully described my invention, what I claim as new and desire to secure by Letters Patent, is:—

1. In a power head, the combination, of a gear casing comprising an oil chamber and having a plurality of suitable bearings therein, gears mounted in opposite plates, a wrist pin interconnecting said gears intermediate their axial center and periphery, means to actuate said gears, a guide shaft mounted in said casing, a sleeve operable on said guide shaft, and a pitman connecting the sleeve to said gears.

2. In a power head, the combination, of a gear casing comprising an oil chamber and having a plurality of removable plates carrying stud shafts, said plates and shafts being adapted to be removed outwardly therefrom, a gear mounted on each of said shafts, a wrist pin interconnecting said gears intermediate their axial center and periphery, slip bearings also fitted to the casing, and a shaft supported in said slip bearings and having pinions which mesh with said gears, all of said mechanism being adapted to receive lubrication from any lubricant contained in said casing.

3. In a power head, the combination, of a gear casing adapted to contain a quantity of lubricant and having an opening for the insertion of the interior mechanism and another opening for the projection of an operating part, with a driving shaft carrying pinions within the casing, driven gears mounted in the casing and spaced apart with a wrist pin connecting them, a pitman mounted on the wrist pin, a guide, and a sleeve mounted thereon, the sleeve being connected with the pitman and having an extension projecting exteriorly through the casing.

4. In a power head, the combination, of a gear casing having a plurality of opposite bearings therein, a gear mounted in each of said bearings, a wrist pin connecting said gears intermediate their axial center and periphery, means to actuate said gears, a guide shaft mounted in said casing, a sleeve operable on said guide shaft and having an arm extending through said casing and adapted to be operably connected externally thereof, and a pitman connecting the sleeve to said gears.

5. In a power head, the combination of a gear casing comprising an oil chamber, and having a plurality of opposite bearings therein, a gear mounted in each bearing, a wrist pin interconnecting said gears intermediate their axial center and periphery, means to actuate said gears comprising a shaft and pinions, a guide in said casing, an operable member mounted on the guide and having an arm extending beyond said casing and adapted to be operably connected externally of the casing, and a pitman connecting said wrist pin and said operable member.

In testimony whereof, I affix my signature.

PHILIP A. MYERS.